United States Patent
Cho et al.

(10) Patent No.: US 12,240,316 B2
(45) Date of Patent: Mar. 4, 2025

(54) RESERVOIR CUP ASSEMBLY OF LPG FUEL TANK FOR VEHICLE

(71) Applicants: Hyundai Motor Company, Seoul (KR); Kia Corporation, Seoul (KR); Dae Hung Precision Ind'l Co., Ltd., Chungcheongnam-do (KR)

(72) Inventors: Seong-cheol Cho, Seoul (KR); Sungwon Lee, Hwaseong-si (KR); Hyeong Gwan Kim, Seoul (KR); Seung Kyun Kim, Seoul (KR); Duk Hee Park, Pyeongtaek-si (KR); Seung Hyun Yeo, Seosan-si (KR)

(73) Assignees: Hyundai Motor Company, Seoul (KR); Kia Corporation, Seoul (KR); Dae Hung Precision Ind'l Co., Ltd., Seosan-si (KR)

( * ) Notice: Subject to any disclaimer, the term of this patent is extended or adjusted under 35 U.S.C. 154(b) by 144 days.

(21) Appl. No.: 18/164,770

(22) Filed: Feb. 6, 2023

(65) Prior Publication Data
US 2024/0262187 A1    Aug. 8, 2024

(51) Int. Cl.
*B60K 15/077* (2006.01)
*B60K 15/03* (2006.01)

(52) U.S. Cl.
CPC .. *B60K 15/077* (2013.01); *B60K 2015/03032* (2013.01); *B60K 2015/03256* (2013.01); *B60K 2015/03309* (2013.01); *B60K 2015/0777* (2013.01)

(58) Field of Classification Search
CPC ........ B60K 15/077; B60K 2015/03032; B60K 2015/03256; B60K 2015/03309; B60K 2015/0777
See application file for complete search history.

(56) References Cited

U.S. PATENT DOCUMENTS

| 2013/0233733 A1* | 9/2013 | Yamamoto | F02M 25/0854 206/204 |
| 2015/0060468 A1* | 3/2015 | Gross | B60K 15/077 220/563 |

FOREIGN PATENT DOCUMENTS

| KR | 10-1990-0004355 | 6/1990 |
| KR | 20-1998-0021182 | 7/1998 |
| KR | 10-2014-0053546 | 5/2014 |
| KR | 101585419 B1 | 1/2016 |
| WO | WO-2020200736 A1 * | 10/2020 |

OTHER PUBLICATIONS

Translation of WO 2020200736 (Year: 2020).*

* cited by examiner

*Primary Examiner* — Patrick C Williams
(74) *Attorney, Agent, or Firm* — Fish & Richardson P.C.

(57) ABSTRACT

A reservoir cup assembly of an LPG fuel tank for a vehicle is configured to be installed on the fuel storage space side of the LPG fuel tank for automobiles, and includes a cup body disposed on the bottom side of the fuel storage space of the fuel tank and having a reservoir space for storing residual LPG fuel and a fuel supply formed on the reservoir space side of the cup body and inducing fuel from the fuel storage space side to the reservoir space side to a state in which fuel can flow in and remain stored.

9 Claims, 7 Drawing Sheets

RESERVOIR CUP ASSEMBLY OF LPG FUEL TANK FOR VEHICLE

TECHNICAL FIELD

The present disclosure relates to a reservoir cup assembly of a fuel tank for a vehicle.

BACKGROUND

Vehicles may use liquefied petroleum gas (LPG) as fuel and include an LPG fuel tank for charging and storing the corresponding fuel.

Depending on the shape of the LPG fuel tank, there are largely a cylindrical tank and a donut (or "toroidal") tank, and the fuel tank is mainly used in a state of being installed inside the trunk of a passenger car.

In some cases, an LPG fuel tank may be used in a state in which liquefied high-pressure gas fuel is charged inside the tank and mounted on a running vehicle. Therefore, a tank structure may provide stably discharging and supplying the charged gas fuel as well as ensuring the stability of charging and storing the gas fuel.

In some cases, the LPG fuel tank may include a tank unit for filling and storing gas fuel, and a fuel supply unit for discharging and supplying the gas fuel filled and stored inside the tank unit to be used for driving the internal combustion engine of a vehicle (e.g., a pump device).

In some cases, a reservoir unit may provide a fuel reservoir function even if the tank unit shakes or tilts according to the driving of the vehicle, such that the gas fuel inside the tank may be discharged and supplied stably by the operation of the fuel supply unit.

Therefore, in order to secure device efficiency and operational stability of the LPG fuel tank for automobiles, it is desirable to have a reservoir unit having a structure capable of realizing fuel reservoir functionality and efficiency corresponding thereto.

SUMMARY

The present disclosure describes a reservoir cup assembly of an LPG fuel tank for a vehicle formed to induce residual storage of the fuel in a state consistent with a stable emission supply of the LPG fuel at the side of the LPG fuel tank for a vehicle.

In order to realize the object of the present disclosure as described above, a reservoir cup assembly of an LPG fuel tank for a vehicle is configured to be installed on the fuel storage space side of the LPG fuel tank for automobiles, and includes: a cup body disposed on the bottom side of the fuel storage space of the fuel tank and having a reservoir space for storing residual LPG fuel; and a fuel supply formed on the reservoir space side of the cup body and inducing fuel from the fuel storage space side to the reservoir space side to a state in which fuel can flow in and remain stored. The fuel supply includes a supply passage formed on the bottom surface of the reservoir space of the cup body and a supply valve disposed on the supply passage side to control the flow of fuel in one direction in a state consistent with the inflow and remaining storage of fuel.

The present disclosure as described above is formed in a state of forming a reservoir space for discharging and supplying fuel inside the LPG fuel tank for automobiles. In particular, the present disclosure provides a reservoir cup structure that can lead to more stable fuel inflow and residual storage in the reservoir space.

Therefore, the present disclosure can expect the effect of further increasing the fuel storage efficiency and stability of the LPG fuel tank for automobiles.

DETAILED DESCRIPTION

Hereinafter, example implementations of the present disclosure will be described with reference to the accompanying drawings.

Figure 1:
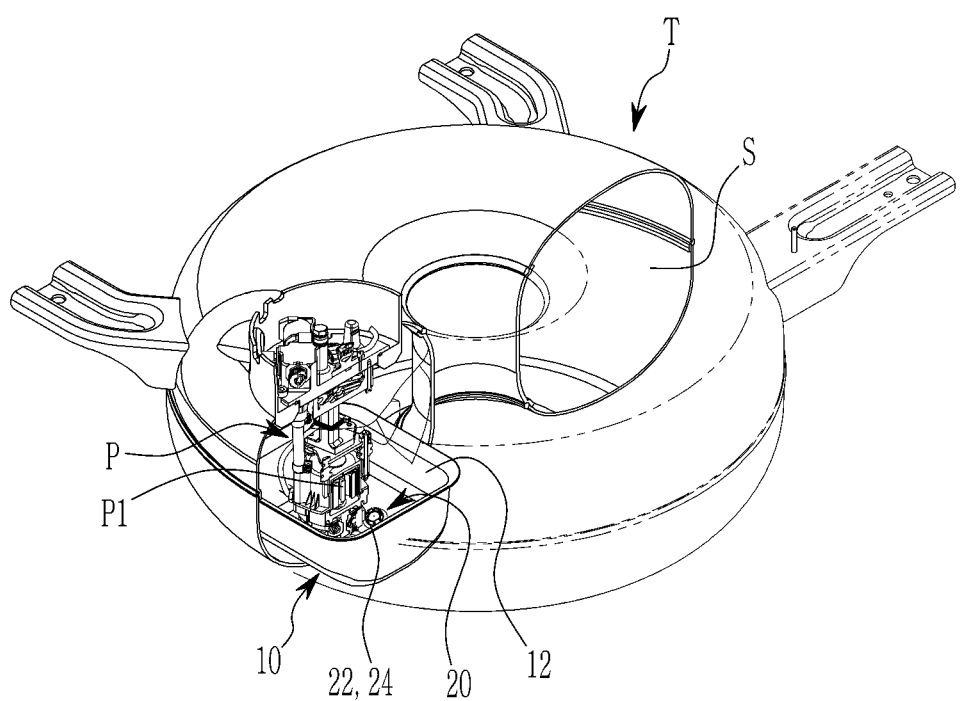
FIG. 1 is a view schematically showing an example structure of a reservoir cup assembly of an LPG fuel tank for a vehicle.

FIG. 1 is a view schematically showing an example structure of a reservoir cup assembly of an LPG fuel tank for a vehicle, FIGS. 2 to 7 are views for explaining the detailed structure and operation of the reservoir cup assembly of the LPG fuel tank for automobiles.

In some implementations, referring to FIGS. 1 to 5, a reservoir cup assembly of an LPG fuel tank for a vehicle includes a cup body 10 and a fuel supply 20.

For example, the reservoir cup assembly, as shown in FIG. 1, can be installed on the LPG fuel tank (T, hereinafter referred to as "fuel tank") side for vehicles having a donut shape (DONUT TYPE). On the side of the fuel tank T, a fuel supply device P for discharging and supplying LPG fuel (G, hereinafter referred to as "fuel") to the outside of the tank by a suction (pumping) action in conjunction with the side of the cup body 10 is provided.

Figure 2:
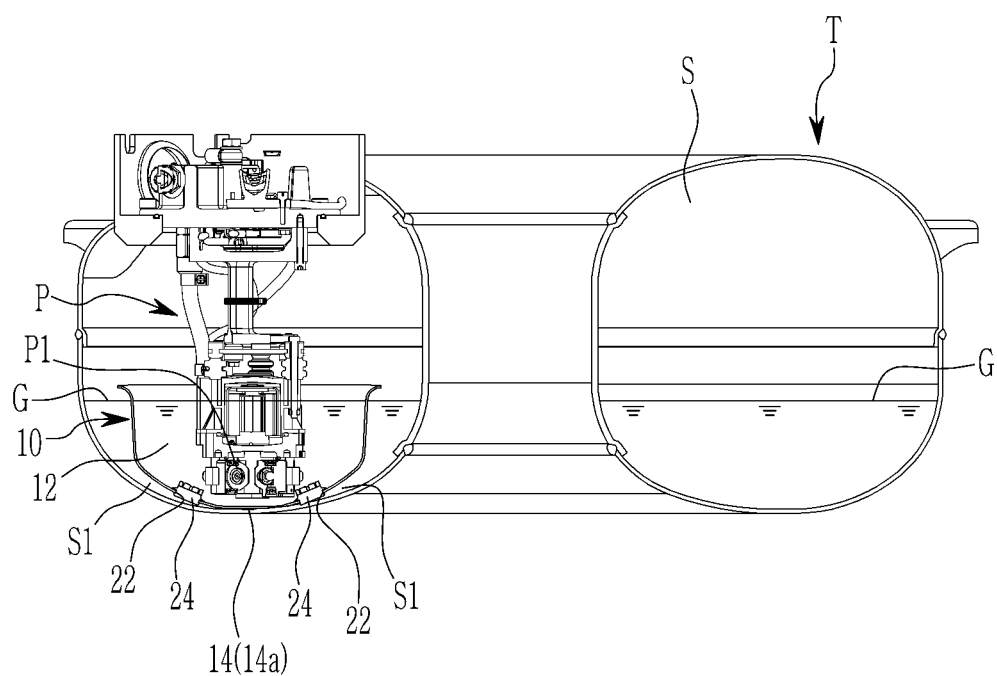
FIGS. 2 to 7 are views for explaining examples of the detailed structure and operation of the reservoir cup assembly of the LPG fuel tank for automobiles.

As shown in FIGS. 1 and 2, the cup body 10 has a reservoir space 12 with an open top inside, and is mounted on the fuel storage space S side of the fuel tank T in a state corresponding to the fuel supply device P side.

The material of the cup body 10 can be used among metal materials and synthetic resin materials. For example, the material of the cup body 10 can be selected from among stainless-based metals with excellent durability and corrosion resistance.

In particular, in a state where the cup body 10 is disposed inside the fuel tank T, it can be stored in a residual storage state in which the fuel G can be stably discharged and supplied in conjunction with the side of the fuel supply 20 to be described later.

Figure 3:
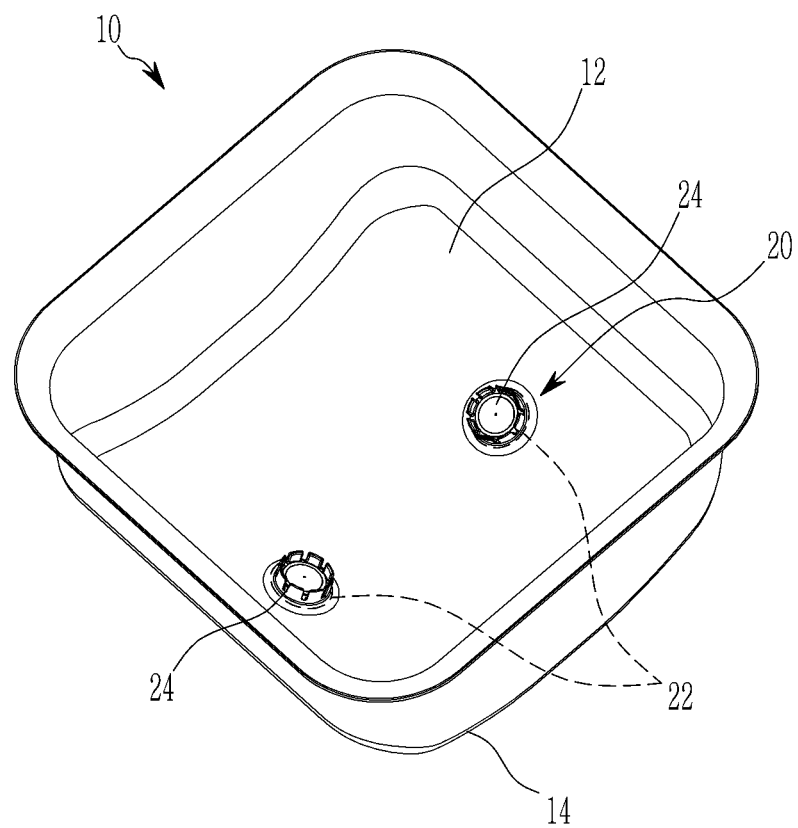

That is, the cup body 10 can be fixedly installed on the bottom surface of the fuel storage space S of the fuel tank T as shown in FIGS. 2 and 3, for example, a reservoir space 12 is formed inside the cup circumference of a quadrangular shape, and the opening side of the reservoir space 12 is arranged so as to correspond to the fuel supply device P side.

At this time, the cup body 10 is fixedly installed on the bottom surface side of the fuel storage space S of the fuel tank T, and as shown in FIG. 2, the cup body 10 is fixedly installed so that the end side of the suction head P1 of the fuel supply device P is disposed in close proximity to the inner bottom surface side of the reservoir space 12.

In addition, the cup body 10 is fixedly installed on the bottom surface side of the fuel storage space S of the fuel tank T, and is fixedly installed in a matching state so as to enable a smooth inducing action on the side of the fuel supply 20 to be described later.

Figure 4:
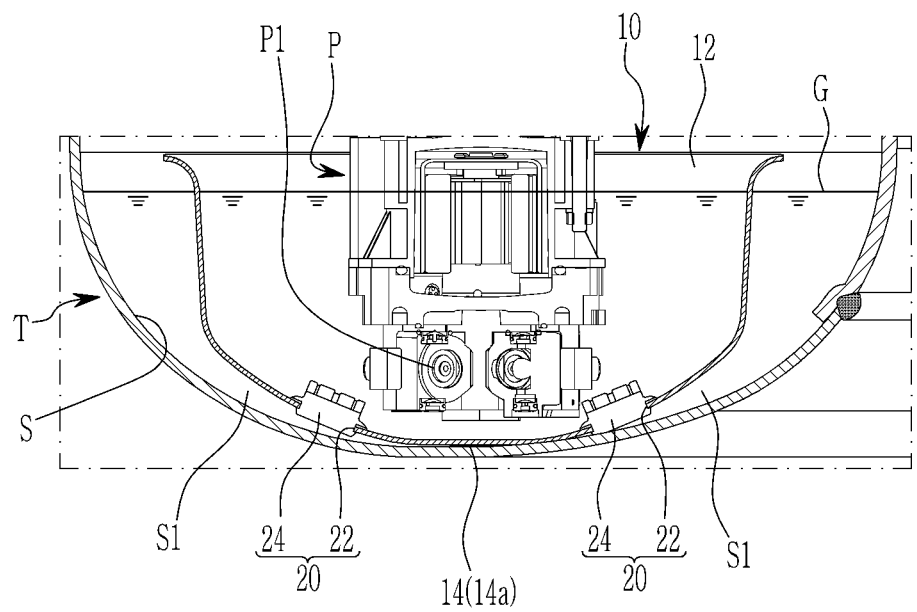

To this end, as shown in FIG. 4, a ground portion 14 for securing a gap can be formed on the bottom surface of the cup body 10, the ground portion 14 for securing the gap can be formed to have a shape in which the bottom surface of the cup protrudes downward in a semicircular shape.

When the cup body 10 side is fixed inside the fuel tank T, as in FIG. 4, the ground portion 14 for securing the gap can provide a grounding structure fixed to the bottom surface of the fuel storage space S in a state in which it is directly contacted and supported. In addition, the fixing treatment operation can be performed in a normal welding method.

Then, below the bottom surface of the cup body 10 bonded and fixed to the fuel storage space S side, supply gaps S1 can be respectively secured in a state corresponding to the fuel supply 20 side with the welding joint 14a on the ground portion 14 side for securing the gap interposed therebetween.

The shape of the cup body 10 is not limited to the outer shape of the rectangular type as described above. In some examples, the cup body 10 can have an external shape corresponding to the shape of the fuel tank T or the condition of the reservoir of the fuel G. In some examples, a curvature of the bottom surface of the cup body 10 can be different from a curvature of the bottom side of the fuel storage space of the fuel tank T.

In some examples, the fuel supply 20 is formed to induce the inflow and residual storage of the fuel G in a state consistent with securing a stable fuel G reservoir environment on the side of the cup body 10.

In particular, the fuel supply 20 is formed to more stably induce the inflow and remaining storage of the fuel G in a state in which the fuel G can be smoothly discharged and supplied through the cup body 10 even if phenomena such as tilting or shaking of the vehicle body occur.

As shown in FIGS. 3 to 4, the fuel supply 20 includes a supply passage 22 formed on the inner surface side of the reservoir space 12 of the cup body 10, and a supply valve 24 installed on the side of this supply passage 22 and for controlling the flow of fuel G in a state consistent with the inflow and residual storage of fuel G.

The supply passage 22 is formed on the inner surface side of the reservoir space 12 of the cup body 10. For example, as shown in FIG. 3, the supply passage 22 can be spaced apart from each other on the inner bottom surface side of the reservoir space 12 and formed in the form of holes respectively drilled downward.

And, as shown in FIG. 4, the supply passage 22 can be formed to be spaced apart from the bottom surface of the cup body 10 with the joint 14a of the ground portion 14 for securing a gap interposed therebetween.

Then, in a state where the cup body 10 side is installed on the inner bottom surface side of the fuel tank T, supply gaps S1 can be secured under the supply passages 22, respectively.

The supply valve 24 is installed on the side of the supply passage 22, respectively, and is set and formed so that the valve action is made to allow the inflow and blocking of fuel G in a state consistent with the reservoir function of the cup body 10.

That is, the supply valves 24 allow fuel G to flow from the outside to the inside of the cup body 10 through each of the supply passages 22, but the discharge of the introduced fuel G can be blocked. Low valve action (one-way fluid flow) is set and configured to be possible.

The supply valve 24 can be selected and used from among various fluid valves, one-way valves having a valve size and shape corresponding to the side of the supply passage 22 and capable of controlling the flow of fluid in one direction. For example, the supply valve 24 can be a check valve.

The fuel supply 20 can induce the remaining fuel G in the tank to be stably stored inside the cup body 10 in a state where the cup body 10 side is installed inside the fuel tank T.

That is, as shown in FIG. 4, the fuel supply 20 can induce the fuel G contained in the fuel storage space S side of the fuel tank T is smoothly introduced into the reservoir space 12 side of the cup body 10 by the supply passage 22 and the supply valve 24 and is confined so that the residue is stored.

In addition, when the remaining level of the LPG fuel G contained in a liquefied state inside the fuel tank T is higher than the point of the supply passage 22 from the bottom surface of the fuel storage space S, through the supply passage 22, the cup body 10 can be introduced into the reservoir space 12 and stored in a state where the remaining storage is induced.

Figure 5:
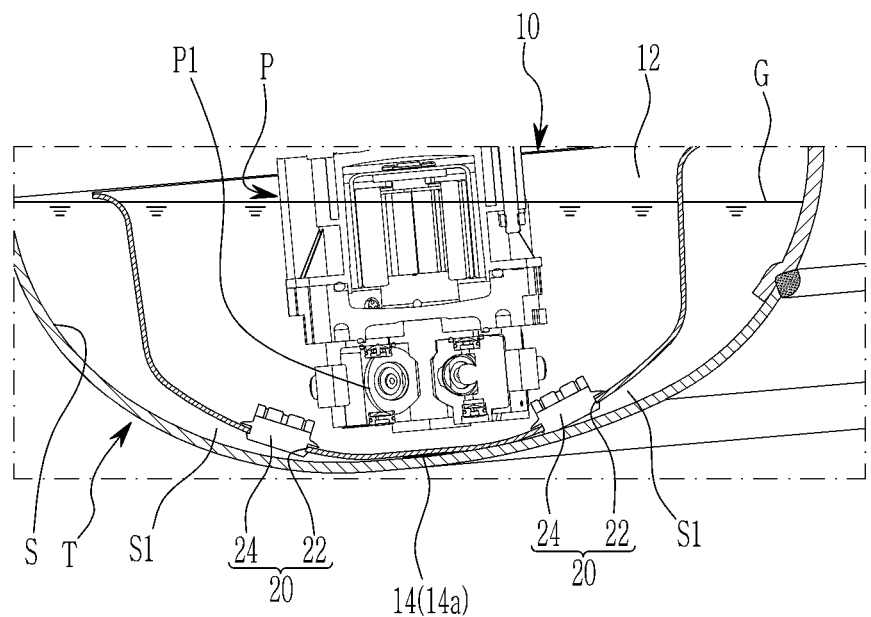

In particular, as shown in FIG. 5, when shaking or tilting of the fuel tank T occurs, the fuel supply 20 can induce residual storage of the fuel G so that the inflow of the remaining fuel G in the fuel storage space S into the inside of the cup body 10 through the supply passage 22 is possible, but the discharge of the introduced fuel G is blocked (suppressed) so as to be confined.

According to the action of the fuel supply 20 as described above, in the reservoir space 12 of the cup body 10, a reservoir environment in which the fuel G can be normally suctioned by the suction head P1 of the fuel supply device P can be maintained.

And, due to this, the exhaust supply of the fuel G can be made in a more stable state consistent with the driving of the vehicle.

Therefore, the fuel supply 20 can further enhance the stability and efficiency of the fuel G reservoir in the reservoir space 12 of the cup body 10.

In addition, the fuel supply 20 is formed on the bottom surface side of the cup body 10, but is not limited to the arrangement and structure formed at two points as shown in FIGS. 3 and 4.

In some implementations, the fuel supply 20 can be spaced apart from one point or two or more points on the side of the cup body 10 to enable the implementation of a reservoir environment that corresponds to the normal shaking or tilting of a vehicle.

Figure 6:
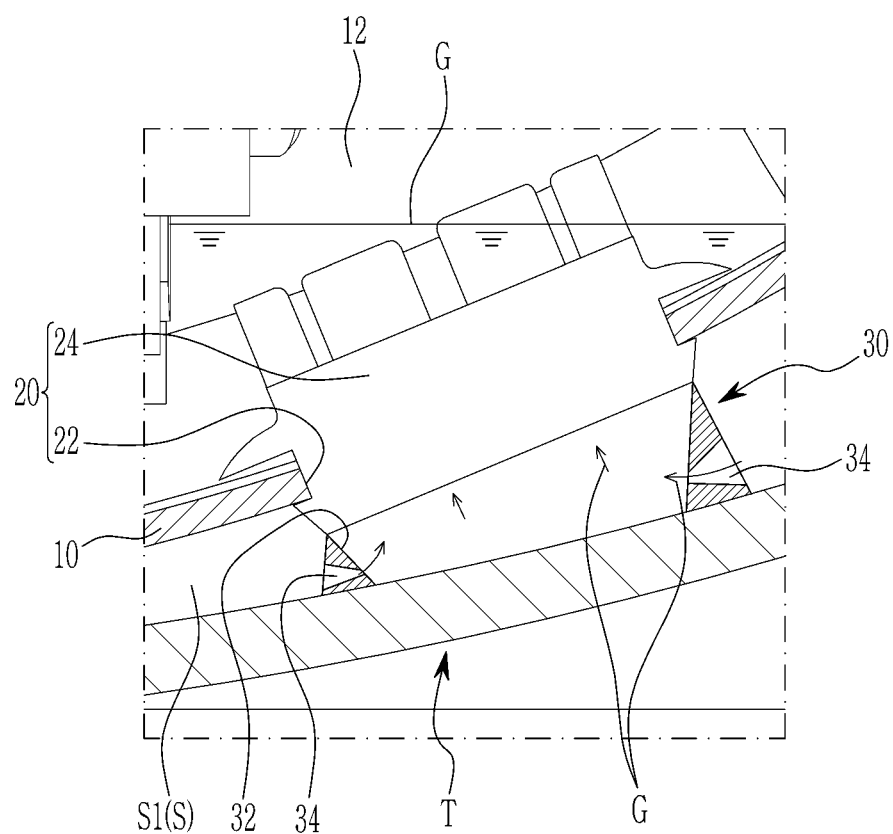
Figure 7:
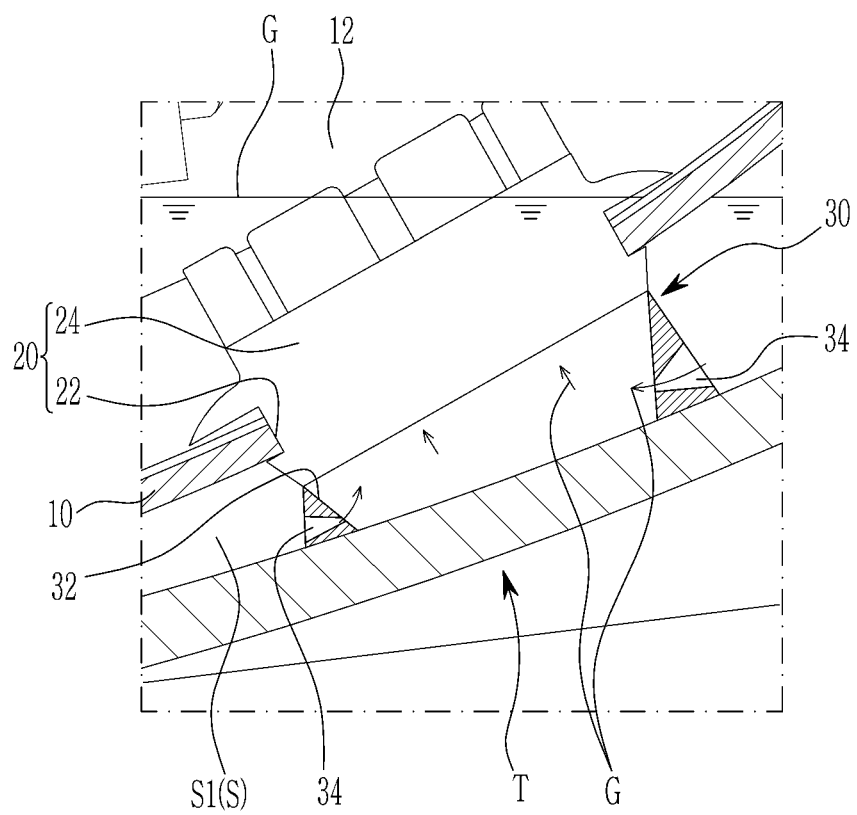

In some implementations, referring to FIGS. 6 to 7, the reservoir cup assembly of the LPG fuel tank for a vehicle can further include an auxiliary supply 30 corresponding to the side of the fuel supply 20.

The auxiliary supply 30 is formed to have a structure capable of increasing the fuel G inflow efficiency of the fuel supply 20 side.

As shown in FIG. 6, the auxiliary supply 30 has an auxiliary passage 32 and an inflow passage 34, is formed in a state of connecting between the supply passage 22 side and the bottom surface of the fuel storage space S of the fuel tank T at the side of the supply gap S1 on the lower side of the cup body 10, and is formed to provide a passage structure through which the inflow of the fuel G can be more smoothly induced on the side of the supply passage 22.

That is, the auxiliary supply 30 connects the side of the supply passage 22 of the cup body 10 and the bottom surface of the fuel storage space S to each other. Therefore, as shown in FIG. 6, an auxiliary passage 32 is formed inside the circumference, and one or more inflow passages 34 are formed on the circumference in a state of being in communication with the auxiliary passage 32 side.

The inflow passage 34 is formed to have a passage shape through which the remaining fuel G contained in the fuel storage space S side of the fuel tank T can be introduced to the auxiliary passage 32 side, and the auxiliary passage 32 is formed to have a passage shape through which the fuel G introduced from the inflow passage 34 can be introduced to the supply passage 22 side.

In particular, the auxiliary passage 32 and the inflow passage 34 can be formed to have a passage shape through which the inflow of the fuel G can be more smoothly induced toward the supply passage 22.

For example, the auxiliary passage 32 is formed inside the circumference of the auxiliary supply 30, and as shown in FIG. 6, it can be formed to have a passage shape in which the size of the circumference of the space gradually increases from the bottom side of the fuel storage space S toward the supply passage 22 side.

Then, for example, as shown in FIG. 7, when the fuel tank T is shaken or tilted in a state where the fuel G is introduced into the auxiliary passage 32, the flow of the fuel G can be more smoothly induced toward the supply passage 22 along the inclined inner surface of the passage.

In addition, the inflow passage 34 is formed through the circumference side of the auxiliary supply 30 as shown in FIG. 6, and can be formed to have a passage shape in which the size of the circumference of the passage gradually decreases from the outside to the inside of the circumference.

Then, the remaining fuel G contained in the fuel storage space S side of the fuel tank T is introduced more smoothly to the side of the auxiliary passage 32 through the inflow passage 34, and the flow of fuel G can be induced so that emission can be suppressed.

In addition, as shown in FIG. 6, the auxiliary supply 30 can be formed to have a shape (e.g., a cone) in which the size of the circumference gradually increases while extending downward from the side of the supply passage 22.

Then, the remaining fuel G contained in the fuel storage space S side can be more smoothly introduced into the inflow passage 34 side.

Such an auxiliary supply 30 is formed in a state corresponding to the side of the supply passage 22 at the bottom of the cup body 10 to induce the remaining fuel G inside the fuel tank T to more smoothly induce inflow to the cup body 10 side.

Therefore, the auxiliary supply 30 can achieve a structure consistent with the improvement of operational efficiency and operational stability of the fuel supply 20 side.

Accordingly, as shown in FIGS. 1 and 2, the present disclosure can provide a reservoir cup structure which is installed inside the fuel tank T so that the fuel G charged and stored inside the tank T can be discharged and supplied more smoothly by the suction (pumping) operation of the fuel supply device P. Residual storage of fuel G can be induced in this state.

While this disclosure has been described in connection with what is presently considered to be practical exemplary implementations, it is to be understood that the disclosure is not limited to the disclosed implementations. On the contrary, it is intended to cover various modifications and equivalent arrangements included within the spirit and scope of the appended claims.

What is claimed is:

1. A reservoir cup assembly configured to be installed in a fuel storage space of a fuel tank of a vehicle, the reservoir cup assembly comprising:
    a cup body configured to be disposed at a bottom side of the fuel storage space of the fuel tank, the cup body defining a reservoir space configured to store a fuel;
    a fuel supply disposed at the reservoir space of the cup body and configured to cause the fuel to be introduced from the fuel storage space to the reservoir space, the fuel supply defining a supply passage at a bottom surface of the reservoir space of the cup body; and
    an auxiliary supply that is disposed at a lower side of the cup body and faces the fuel supply,
    wherein the fuel supply comprises a supply valve disposed at the supply passage and configured to control a flow of the fuel based on an inflow amount of the fuel to the reservoir space and a residual amount of the fuel in the reservoir space, and
    wherein the auxiliary supply defines:
        an auxiliary path that is surrounded by a circumferential surface of the auxiliary supply and connects between the supply passage and the bottom surface of the fuel storage space, and
        an inflow passage is defined at the circumference surface of the auxiliary supply and in fluid communication with the auxiliary path.

2. The reservoir cup assembly of claim 1, wherein the cup body includes a ground portion that protrudes from the bottom surface of the reservoir space toward the bottom side of the fuel storage space to thereby define a gap between the bottom surface of the reservoir space and the bottom side of the fuel storage space, and
    wherein the ground portion is configured to be fixed to the bottom surface of the fuel storage space by welding.

3. The reservoir cup assembly of claim 1, wherein the cup body includes one or more of supply passages that pass through the bottom surface of the reservoir space of the cup body.

4. The reservoir cup assembly of claim 1, wherein the supply valve is a one-way valve configured to allow introduction of the fuel into the cup body through the supply passage and to block discharge of the fuel from the cup body.

5. The reservoir cup assembly of claim 1, wherein the fuel comprises liquefied petroleum gas (LPG).

6. The reservoir cup assembly of claim 1, wherein a curvature of the bottom surface of the cup body is different from a curvature of the bottom side of the fuel storage space of the fuel tank.

7. The reservoir cup assembly of claim 1, wherein the cup body accommodates a fuel pump in the reservoir space.

8. The reservoir cup assembly of claim 7, wherein the fuel supply comprises a plurality of valves including the supply valve, and
    wherein the plurality of valves are disposed at the bottom surface of the cup body and spaced apart from each other, the fuel pump being disposed between the plurality of valves.

9. The reservoir cup assembly of claim 1, wherein at least a portion of the bottom surface of the cup body is configured to be in contact with the bottom side of the fuel storage space of the fuel tank.

* * * * *